US010076726B2

(12) United States Patent
Wolters et al.

(10) Patent No.: US 10,076,726 B2
(45) Date of Patent: Sep. 18, 2018

(54) METHOD FOR PRODUCING A MEMBRANE AND SUCH MEMBRANE

(75) Inventors: Hans Hendrik Wolters, Leeuwarden (NL); Harm van Dalfsen, Leeuwarden (NL); Sybrandus Jacob Metz, Leeuwarden (NL)

(73) Assignee: METALMEMBRANES.COM B.V., Leeuwarde (NL)

( * ) Notice: Subject to any disclaimer, the term of this patent is extended or adjusted under 35 U.S.C. 154(b) by 427 days.

(21) Appl. No.: 13/379,936

(22) PCT Filed: Jul. 20, 2010

(86) PCT No.: PCT/NL2010/000115
§ 371 (c)(1),
(2), (4) Date: Mar. 8, 2012

(87) PCT Pub. No.: WO2011/010914
PCT Pub. Date: Jan. 27, 2011

(65) Prior Publication Data
US 2012/0160694 A1     Jun. 28, 2012

(30) Foreign Application Priority Data
Jul. 20, 2009   (NL) ..................................... 2003250

(51) Int. Cl.
*C25D 11/04*     (2006.01)
*C25D 11/26*     (2006.01)
(Continued)

(52) U.S. Cl.
CPC ....... *B01D 67/0065* (2013.01); *B01D 67/009* (2013.01); *B01D 71/025* (2013.01);
(Continued)

(58) Field of Classification Search
CPC .................. C25D 11/026; C25D 11/18–11/24
(Continued)

(56) References Cited

U.S. PATENT DOCUMENTS

| 5,385,662 | A | * | 1/1995 | Kurze et al. .................. 205/316 |
| 6,139,713 | A | * | 10/2000 | Masuda et al. ............... 205/206 |
| 2004/0149586 | A1 | * | 8/2004 | Sul ................. 205/171 |
| 2007/0256562 | A1 | * | 11/2007 | Routkevitch et al. ............ 96/11 |
| 2008/0006574 | A1 | * | 1/2008 | Ramaswamy et al. ........ 210/490 |
| 2008/0070056 | A1 | * | 3/2008 | Hatanaka et al. ............. 428/593 |
| 2009/0292346 | A1 | * | 11/2009 | Norlin ........................ 607/119 |
| 2010/0252241 | A1 | * | 10/2010 | McDermott et al. ......... 165/151 |

(Continued)

FOREIGN PATENT DOCUMENTS

EP      0178831     4/1986
EP      2077343     7/2009
(Continued)

OTHER PUBLICATIONS

Furneaux, R.C.; Rigby, W.R.; Davidson, A.P.The formation of controlled-porosity membranes from anodically oxidized aluminum. Nature, vol. 337, Jan 1989, p. 147-149.*
(Continued)

*Primary Examiner* — Brian W Cohen
(74) *Attorney, Agent, or Firm* — Edward J. Baba; Bozicevic, Field & Francis LLP

(57) ABSTRACT

The invention relates to a method for producing a membrane and such membrane. The method comprises the steps of: —providing a container with electrolyte; —placing a structure in the container; and —providing at least two electrodes with a potential difference to achieve a plasma electrolytic oxidation on the structure. Preferably, the structure comprises a metallic structure, with the metallic structure chosen from the group of Titanium, Aluminum, Magnesium, Zirconium, Zinc and Niobium, and/or an alloy.

9 Claims, 4 Drawing Sheets

(51) Int. Cl.
  *C25D 11/30*   (2006.01)
  *C25D 5/18*   (2006.01)
  *C25D 21/12*   (2006.01)
  *B01D 67/00*   (2006.01)
  *B01D 71/02*   (2006.01)
  *H01M 8/22*   (2006.01)
  *C25D 11/02*   (2006.01)

(52) U.S. Cl.
  CPC .......... *C25D 11/024* (2013.01); *C25D 11/026* (2013.01); *C25D 11/04* (2013.01); *C25D 11/26* (2013.01); *C25D 11/30* (2013.01); *H01M 8/227* (2013.01); *B01D 2325/24* (2013.01)

(58) Field of Classification Search
  USPC .................................................. 205/316–333
  See application file for complete search history.

(56) References Cited

U.S. PATENT DOCUMENTS

2010/0258445 A1* 10/2010 Arurault et al. .............. 205/222
2011/0218643 A1* 9/2011 Yerokhin ..................... 623/23.6

FOREIGN PATENT DOCUMENTS

WO     03016596   2/2003
WO   WO 2009056744 A2 * 5/2009

OTHER PUBLICATIONS

International Search Report for PCT Application No. PCT/NL2010/000115 dated Dec. 3, 2010.

* cited by examiner

METHOD FOR PRODUCING A MEMBRANE AND SUCH MEMBRANE

The present invention relates to a method for producing a membrane. Such membrane can be used in electro-membrane processes, for example. These processes include electro-dialysis, reverse electro-dialysis etc. The membranes can also be used for filtration processes, like for wine, beer, milk, water or other fluids, and gas separation processes.

Known methods for producing a membrane comprise a sintering operation wherein step by step parts of the membrane material are integrated into the membrane. This method takes a rather long period of time and, in addition, is relatively costly.

In an alternatively known method to produce a membrane use is made of ceramic material. These materials are expensive and sensitive to shocks.

The object of the present invention is to provide an improved method to produce a membrane.

This object is achieved with the method for producing a membrane according to the present invention, the method comprising the steps of:
- providing a container with electrolyte;
- placing a structure in the container; and
- providing at least two electrodes with a potential difference to achieve a plasma electrolytic oxidation on the structure.

By providing the electrodes with a potential difference an electrochemical treatment of the structure, which will be treated with the method according to the invention, is achieved. In fact, a type of plasma electrolytic oxidation is performed on the structure. The electrolyte is a conductive fluid, preferably a liquid phase, or alternatively a gas phase. The structure comprises at least one layer of material that is treated with the plasma electrolytic oxidation to realise a porous product capable to act as a membrane. Optionally, the structure also comprises an additional support layer.

Preferably, the structure is a metallic structure that preferably is porous. By applying a potential difference, thereby achieving a plasma electrolytic oxidation process in the container with the electrolyte, locally the electric breakdown potential of the oxide film on the structure is exceeded and discharges occur. Such discharges lead to a type of local plasma reactors, resulting in a growing oxide. This builds the desired structure for the membrane.

The potential difference is achieved by providing the electrodes with a different voltage or current. The plasma electrolytic oxidation operation creates very fine pores in metals, thereby forming an oxide layer with a lower electrical conductivity than the structure, and is preferably formed of a metal material. The metal oxide layer contains small pores that can be used for separation processes, such as for electro-membrane processes, and also for filtration and gas separation process.

According to the invention it is possible to provide separate electrodes in the container. Alternatively, according to the invention it is also possible to use the structure and/or container as one of the electrodes. This leads to an efficient process as no separate electrodes are required. Furthermore, according to the invention it may be possible to provide the structure as container with an electrode inside the structure, of course depending on the desired shape of the membrane.

The method according to the invention provides a membrane that can be made efficiently. Surprisingly, also the pore sizes can be controlled more effectively. As a result, the characteristics of the membrane resulting from the method according to the invention can be realised more accurately. This enables a production of membranes based upon a specification of the desired characteristics of the membrane, like pore sizes. Surprisingly, the membrane that is produced with the method according to the invention is more stable and robust as the bonding between the membrane particles is significantly stronger as compared to the resulting membranes from conventional production methods. As one of the results of such stronger bonding, cracking of the resulting membrane is less likely in case the membrane is produced according to the method according to the invention.

A further advantage of the method according to the invention is that it enables the production of membrane material in a modular way. For example, this is not possible when dealing with ceramic material membranes as these have to be put into the desired configuration thereby risking damage to the membrane. In fact, a significant relevant effect or advantage of the method according to the invention is that complicated three-dimensional shapes of the membrane are possible to be handled in the method for producing such membrane. For example, besides a plate shaped membrane also a pipe shaped membrane can be produced relatively efficiently.

According to the invention the thickness of the structure to be treated to form a membrane can be chosen freely. In a currently preferred embodiment, a thickness of about 1 mm is typically used for practical reasons.

For example, the electrolyte is prepared using KOH, $K_2SO_4$, $NA_3PO_4.12H_2O$, $Na_2SiO_3$ an/or $KAlO_2$.

Preferably, the metal or alloy of the metallic structure is chosen from the group of materials that is able to form a non-conductive oxide, like titanium, aluminium, magnesium, zirconium, zinc and niobium, or an alloy. Experiments have shown that this specific group of materials results in a membrane with the desired characteristics and can be produced in an efficient manner. The discharges that occur in the plasma electrolytic oxidation process (partially) convert amorphous alumina into crystalline forms like corundum ($\alpha$-$Al_2O_3$) that is much harder.

In a preferred embodiment of the invention a container is filled with electrolyte comprising a dilute alkaline fluid or solution, preferably in a liquid phase, or alternatively in a gas phase. An example of such solution is KOH and $Na_2SiO_4$. The type of electrolyte used for producing a specific membrane can be decided, amongst other things, based on the desired characteristics of the membrane.

In a preferred embodiment according to the present invention, the structure is placed between the at least two electrodes.

By placing the between the electrodes the plasma affects the entire structure and is not limited to the surface area only. The depth of penetration is thereby much higher as compared to a surface treatment. Although placing the structure between the at least two electrodes is a preferred embodiment, as an alternative embodiment of the invention it would be possible to use the metallic structure as one of the electrodes. Furthermore, alternatively or in combination therewith, according to the invention it would be possible to use the container as one of the electrodes. In fact, according to the invention, it would be possible to use both the structure and the container as electrodes such that it is not required to use separate electrodes.

In a preferred embodiment according to the present invention the structure is chosen from a composite structure comprising a support layer, and a metal and/or alloy layer.

By providing a composite structure comprising at least two different layers an efficient production process of a membrane is achieved. Preferably, the support structure is of a metallic material to enable an efficient sterilisation of the membrane.

Optionally, the method to produce a membrane comprises the step of removing the support layer, preferably partially. Such removal of, preferably a part of, the support layer can be achieved in an etching operation and/or electrochemical dissolution of the metal. For example, a titanium layer is provided on a support layer, the support layer being partly removed by etching to realise a membrane and still achieve efficient support for the product.

In a further preferred embodiment according to the present invention, the structure is chosen from an existing membrane.

By providing an existing membrane as a structure, preferably a metallic structure, a type of post treatment of such existing membrane is achieved. With this method an existing membrane can be regenerated thereby prolonging its life span. In addition, the pore sizes of the existing membrane can be controlled efficiently thereby improving the quality of the membrane and thereby the process wherein the membrane is being applied. Preferably, before the plasma oxidation operation is performed on the existing membrane the pores of this membrane are closed. This can be achieved by heating the material relatively fast thereby melting the top layer only, and grinding the material, for example.

In a further preferred embodiment according to the present invention providing a potential difference comprises applying a voltage of over 100 Volt, and preferably of over 200 Volt.

Applying a potential of over 100 Volt, and preferably over 200 Volt, between the at least two electrodes results in local discharges and local plasma reactors wherein a type of plasma electrolytic oxidation process takes place. This results in a membrane.

Providing the potential difference preferably comprises applying a continuous and/or pulsed direct current and/or a continuous and/or pulsed alternating current. This includes every combination of direct currents and/or alternating currents. It may also include negative or bipolar pulses. Also combinations of these signals that are provided to the electrodes are possible. The choice for a specific type of signal may depend on the desired characteristics of the membrane resulting from the method according to the invention. To further improve the characteristics of the membrane achieved with the method according to the invention, also other process parameters can be chosen or manipulated, like the choice for a specific type or types of material and/or the configuration of the electrodes and/or the electrolyte composition.

The present invention also relates to a membrane comprising a structure and a porous layer provided on the structure using a method as described above.

Such membrane provides the same effects and advantages as those related to the method. Preferably, the porous layer comprises pores in the range of 0-2 micrometer, and preferably 1-100 nm. The use of membranes with such pore sizes improves separation processes wherein the membrane is applied, for example.

Preferably, the majority of the pores, more preferably at least 75%, and even more preferably at least 90%, lies in the specified range described above. With a membrane having a controlled pore size it is possible to improve a separation process even further.

Further advantages, features and details of the invention are elucidated on basis of preferred embodiments thereof, wherein reference is made to the accompanying drawings, wherein.

Figure 3A:
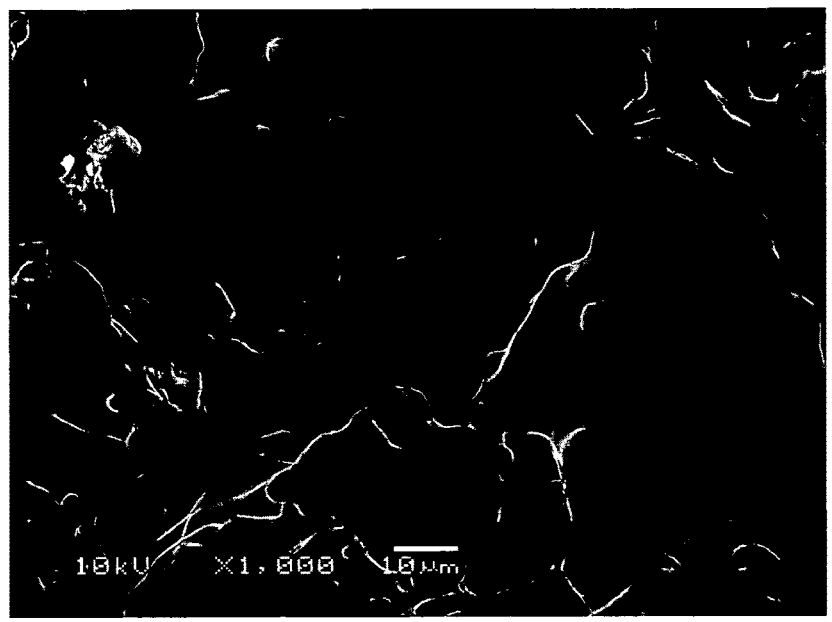
Figure 4A:
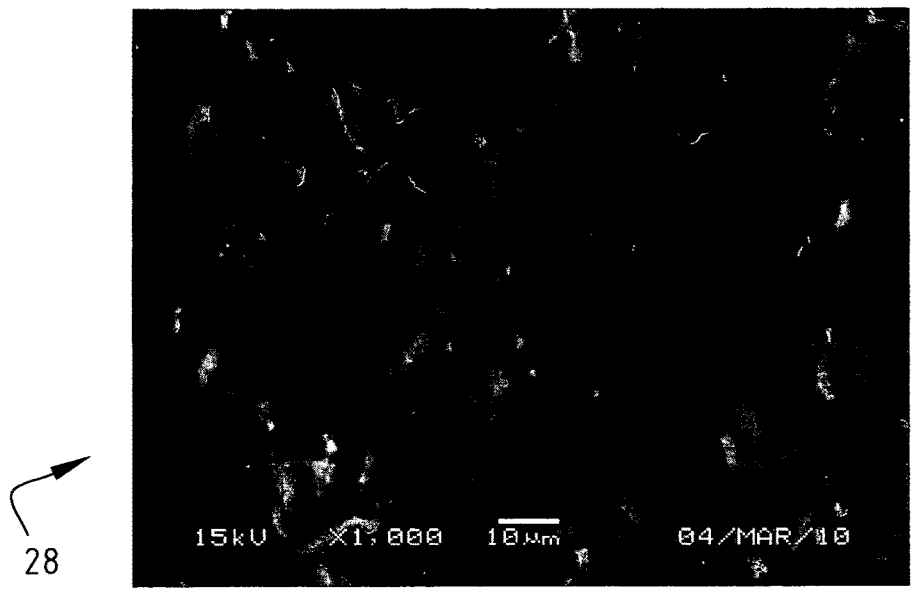
Figure 4B:
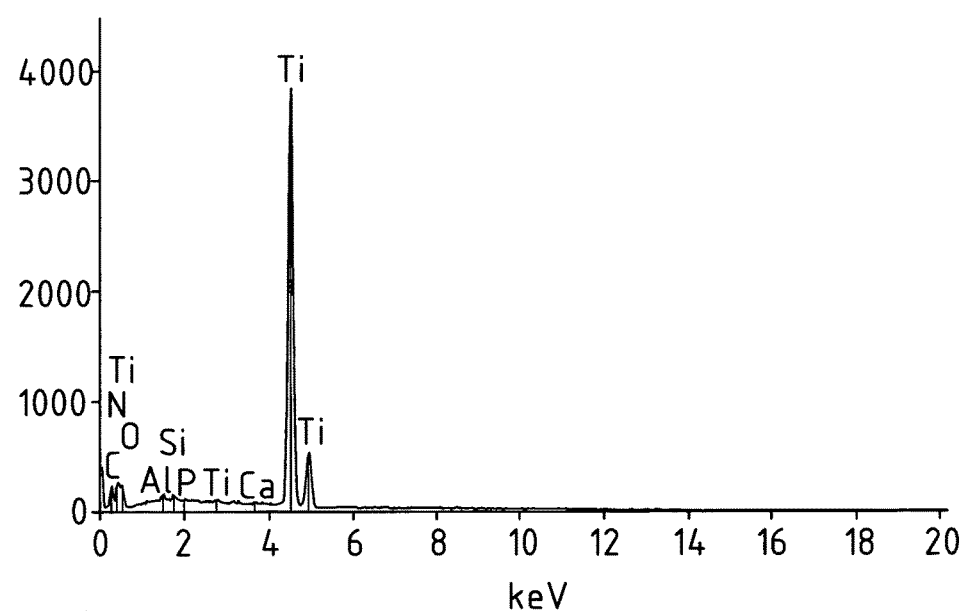
Figure 5A:
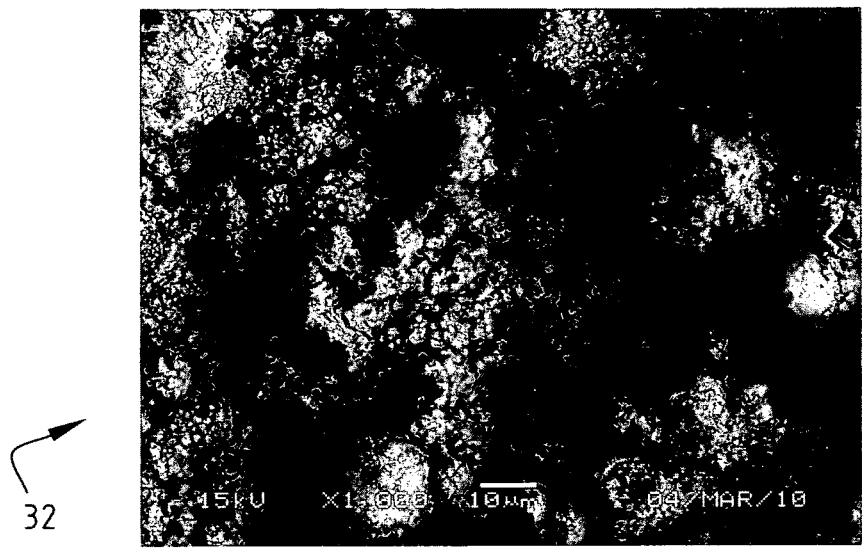
Figure 5B:
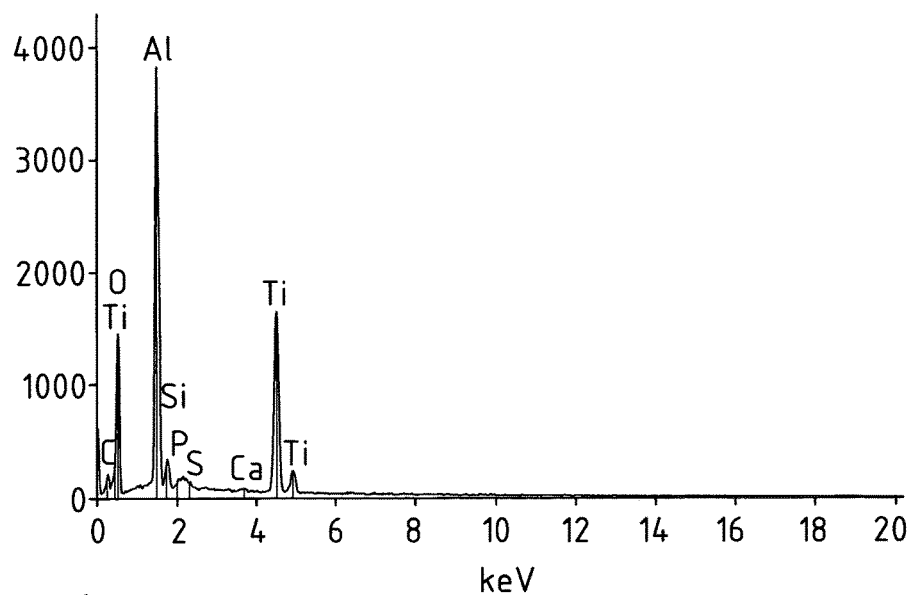

FIGS. 3A and B show membrane surfaces of an existing method and the method according to the invention, respectively;

FIG. 4A shows an electron microscope image of an untreated titanium structure;

FIG. 4B shows the results of an Energy-Dispersive X-ray (EDX) measurement, indicating the composition of the untreated structure of FIG. 4A;

FIG. 5A shows an electron microscope image of the titanium structure of FIG. 4A after treatment with the method according to the invention; and FIG. 5B shows the results of an EDX measurement, indicating the composition of the treated structure of FIG. 5A.

Figure 1:
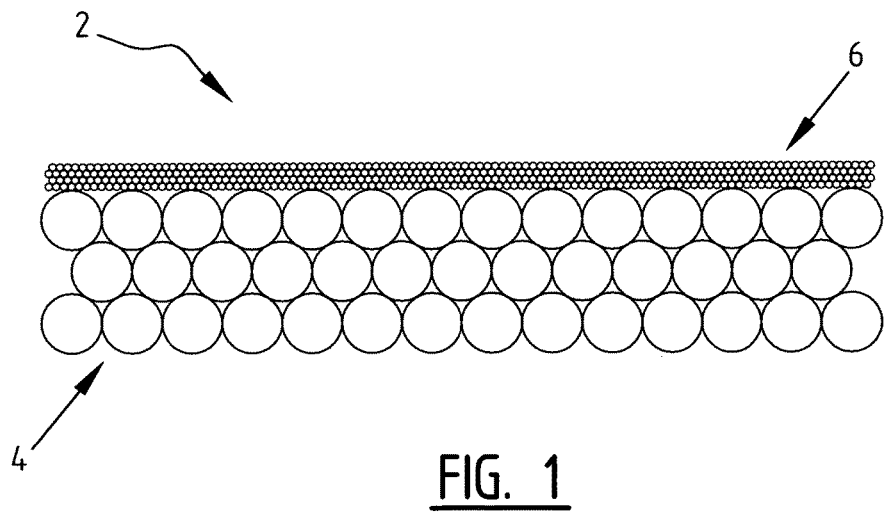
FIG. 1 shows a membrane according to the invention.

A membrane 2 (FIG. 1) comprises a metallic structure 4. In the illustrated embodiment support layer 4 is provided from titanium. On layer or structure 4 is provided a membrane layer 6 that is provided thereon by plasma electrolytic oxidation. Layer 6 comprises $TiO_2$ that expands in the process. The titanium structure is of a plate or tube-shape. In the illustrated embodiment the structure of a sintered material is made by sintering titanium particles in the desired shape. Optionally, the titanium material is heated very shortly on the outside or treated mechanically to form a dense titanium layer on top of the sintered structure that is subjected in the next step to the plasma electrolytic oxidation process.

Figure 2:
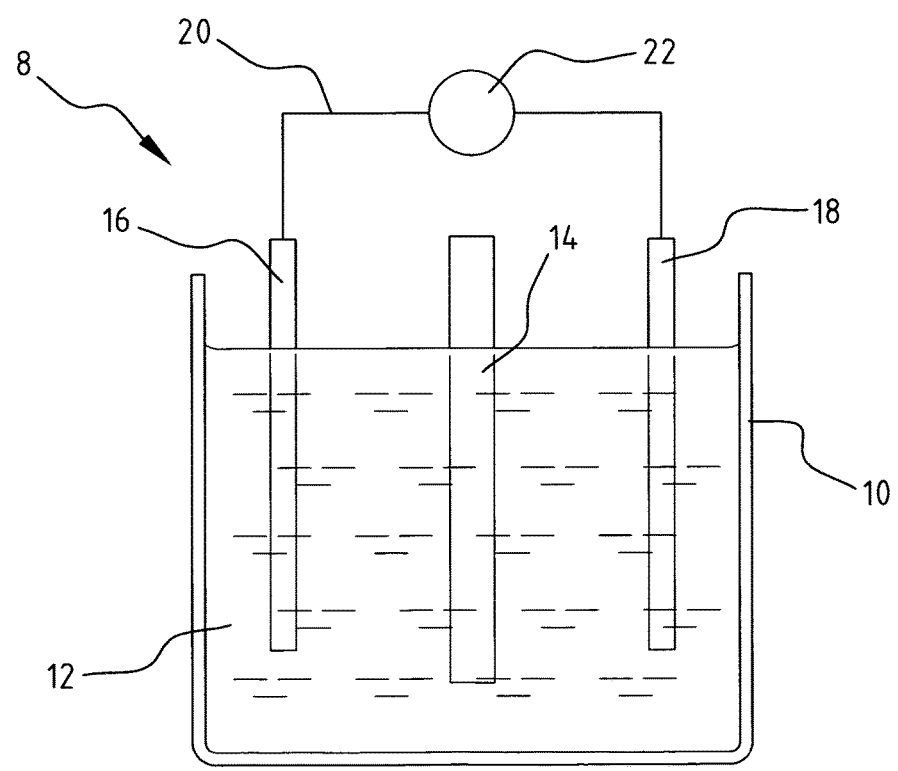
FIG. 2 shows a device for producing such membrane.

In a process 8 (FIG. 2) a container 10 is provided with electrolyte 12. A product 14 is placed between a first electrode 16 and a second electrode 18 in electrolyte 12. Electrodes 16, 18 are connected in a circuit 20. Circuit 20 comprises a voltage source 22 to provide a potential difference to electrodes 16, 18.

When producing a membrane 2, 14 a structure is placed in a container 10 filled with electrolyte 12. Depending on the desired characteristics of membrane 2, 14 the type of material is chosen. Also, the shape of membrane 2, 14 is chosen. For example, tube like membranes can be produced effectively in process 8. It will be understood that it is also possible to produce other three dimensional shapes for the membrane in process 8. After placing the product 2, 14 in electrolyte 12 a potential difference is provided over electrodes 16, 18. The conditions for this potential difference are chosen such that a plasma electrolytic oxidation operation takes place on the product 2, 14 to achieve a membrane 2, 14.

In an alternative embodiment according to the invention, the product 2, 14 acts as one of the electrodes in process 8. This reduces the amount of separate electrodes that are used in process 8. Furthermore, the wall of container 10 may act as one of the electrodes. This enable the use of container 10 and product 2, 14 as electrodes 18, 20, such that no separate electrodes are required.

A membrane 2, comprising a palladium layer, can be used for gas separation processes, for example. Hydrogen dissolves in the metal grid of palladium and diffuses to the permeate side of membrane 2. This takes place at relatively high temperatures, normally above 300° C. By configuring membrane 2, such that only hydrogen passes membrane 2, hydrogen can be separated very effectively.

According to one of the preferred embodiments according to the invention membrane 2 is produced starting with a metal layer comprising palladium and titanium. Such membrane can be used for the gas separation processes mentioned above, for example. Conventionally, the palladium is provided after a titanium layer is made porous. According to the present invention, the palladium is provided in a process that in itself is known to the skilled person on a titanium foil, using chemical vapour deposition, for example. In a next step, the structure is treated, using the method according to the invention, with a plasma electrolytic oxidation operation. The titanium layer gets porous, while at the same time the palladium layer remains substantially non-porous. According to this method a composite membrane is achieved very effectively with a porous titanium layer and a relatively thin palladium layer.

The method according to the invention may use other materials in stead of palladium. For example, copper can be provided. After the plasma oxidation operation the pores in the titanium layer stop at the copper layer as copper does not form an oxide in this operation. By etching a part of the copper support layer a membrane 2 is achieved. Also other metals can be used, including titanium, as support layer.

Figure 3B:
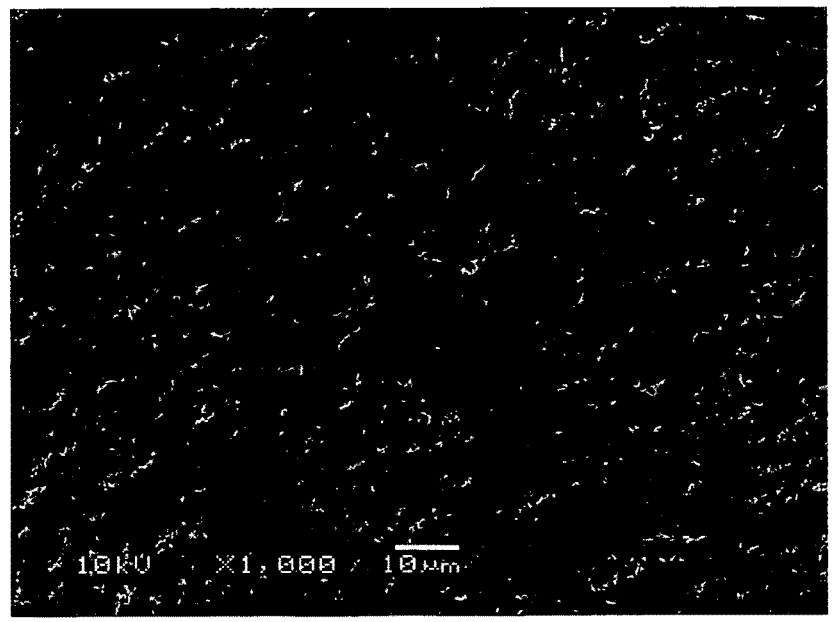

Experiments have been performed with a process 8 to produce a membrane 2 according to the invention. The resulting membrane 2 is compared to existing membranes that are being produced with a sintering operation. The result of such existing conventional operation (FIG. 3A) shows relatively large pore sizes with a relatively large spread of these sizes. For example, the pore size of the pore in the middle of FIG. 3A of a membrane 24 that is produced in a known manner is about 30 micrometer. The membrane 26 (FIG. 3B) that is produced according to the method according to the invention is illustrated on the same scale and shows a pore size of the order of magnitude of nanometers. At the same time the range of pore sizes in membrane 26 is relatively small so that the characteristics of membrane 26 are controlled more accurately.

In an experiment, an existing porous titanium membrane is used as a structure for treatment according to the invention. The porous titanium membrane has been produced by a conventional method of membrane production, namely by sintering. Electron microscope image 28 (FIG. 4A) shows the structure before the method according to the invention is applied.

The composition of the structure of FIG. 4A is determined by Energy Dispersive X-ray (EDX) spectroscopy. Graph 30 (FIG. 4B) shows the results. The x-axis depicts the energy in keV and the y-axis depicts the number of counts. Table 1 shows the quantitative results for the different peaks of graph 30. The results show that the structure substantially comprises titanium.

TABLE 1

Quantitative results of energy-dispersive X-ray spectroscopy of a porous titanium structure before applying the method according to the invention.

| Element line | Net Counts | Weight % | Atom % |
|---|---|---|---|
| C K | 247 | 3.18 | 9.65 |
| O K | 210 | 10.92 | 24.86 |
| Al K | 66 | 0.26 | 0.35 |
| P K | 22 | 0.07 | 0.08 |
| Ti K | 11147 | 85.57 | 65.06 |
| Ti L | 666 | — | — |
| Total | | 100.00 | 100.00 |

Subsequently, the porous titanium structure is treated according to the invention. The method is carried out using an electrolyte comprising an aluminium salt. Electron microscope image 32 (FIG. 5A) shows the resulting surface layer of the structure. Clearly, the pores of the treated structure are reduced in size compared to the untreated structure of image 28 (FIG. 4A).

The composition of the treated structure of FIG. 5A is again determined using EDX spectroscopy. Graph 34 (FIG. 5B) shows the results. Table 2 shows the quantitative results for the different peaks of graph 34. These results show that the structure comprises a titanium aluminate. By using aluminium salt in the electrolyte, the surface layer of the untreated titanium structure has been transformed to a titanium aluminate.

TABLE 2

Quantitative results of energy-dispersive X-ray spectroscopy of the porous titanium structure after applying the method according to the invention.

| Element line | Net counts | Weight % | Atom % |
|---|---|---|---|
| C K | 376 | 3.66 | 6.83 |
| O K | 3737 | 42.89 | 60.17 |
| Al K | 12698 | 20.15 | 16.76 |
| Si K | 1038 | 1.78 | 1.42 |
| P K | 105 | 0.17 | 0.12 |
| Ti K | 8504 | 31.35 | 14.69 |
| Ti L | 535 | — | — |
| Total | | 100.00 | 100.00 |

The present invention is by no means limited to the above described preferred embodiments thereof. The rights sought are defined by the following claims, within the scope of which many modifications can be envisaged.

The invention claimed is:

1. A method for producing a membrane, comprising the steps of:

providing a container with electrolyte;

placing a structure comprising at least one layer of material in the container, wherein the structure comprises a metal and/or alloy layer;

providing at least two electrodes with a potential difference to achieve a plasma electrolytic oxidation on the structure, wherein providing a potential difference comprises applying a voltage of over 100 Volts, such that a plurality of pores are created in a metal oxide layer on the metal and/or alloy layer to form a membrane, wherein at least 90% of the plurality of pores created in the metal oxide layer on the metal and/or alloy layer have a diameter that is within 1 nm to 100 nm at a surface of the metal oxide layer; and removing only a part of the metal and/or alloy layer by an electrochemical etching operation.

2. The method according to claim 1, wherein the metallic structure is chosen from the group of Titanium, Aluminium, Magnesium, Zirconium, Zinc and Niobium, and/or an alloy.

3. The method according to claim 1, wherein the step of providing a container with electrolyte comprising choosing an electrolyte from the group of dilute alkaline fluids or solutions.

4. The method according to claim 1, wherein the structure is placed between the at least two electrodes.

5. The method according to claim 1, wherein the structure is chosen from an existing membrane.

6. The method according to claim 1, wherein providing a potential difference comprises applying a voltage of over 200 Volts.

7. The method according to claim 1, wherein providing a potential difference comprising applying a continuous and/or pulsed direct current, and/or a continuous and/or pulsed alternating current, including negative or bipolar pulses.

8. The method according to claim 7, wherein the pulsed direct and/or alternating current comprising negative or bipolar pulses.

9. The method according to claim 1, wherein achieving a plasma electrolytic oxidation on the structure comprises exceeding an electric break-down potential of an oxide film on the structure thereby causing discharges to occur.

* * * * *